United States Patent [19]

Davis, Jr.

[11] Patent Number: 5,666,103

[45] Date of Patent: Sep. 9, 1997

[54] WIRELESS SAFETY INDICATOR CONTROL SYSTEM FOR TOWED VEHICLES

[76] Inventor: James Ferris Davis, Jr., 101 Manor Ct., Sanger, Tex. 76266

[21] Appl. No.: 547,945

[22] Filed: Oct. 25, 1995

[51] Int. Cl.⁶ .................. B60Q 1/26; B60Q 1/34
[52] U.S. Cl. .......... 340/479; 340/475; 340/431; 340/463; 307/10.8; 362/61
[58] Field of Search .................. 340/431, 479, 340/475, 463; 362/61; 307/10.8

[56] References Cited

U.S. PATENT DOCUMENTS

| | | | |
|---|---|---|---|
| 4,801,917 | 1/1989 | Winterfeld | 340/475 |
| 4,859,982 | 8/1989 | Seaburg | 340/475 |
| 5,195,813 | 3/1993 | Brown | 362/62 |
| 5,198,798 | 3/1993 | Lietzow et al. | 340/475 |
| 5,424,715 | 6/1995 | Lietzow et al. | 340/475 |

FOREIGN PATENT DOCUMENTS

WO8911984 12/1989 WIPO .................. 340/475

*Primary Examiner*—Jeffery Hofsass
*Assistant Examiner*—Daniel J. Wu
*Attorney, Agent, or Firm*—James E. Bradley

[57] ABSTRACT

In response to detecting activation of a safety indicator on the towing vehicle, a radio frequency control signal is transmitted from a transmitter means on the towing vehicle. Thereafter, the radio frequency control signal is received on a towed vehicle using receiver means powered by a power source located on the towed vehicle. In response to receiving the radio frequency control signal, a safety indicator on the towed vehicle is automatically connected to the power source on the towed vehicle to activate the safety indicator on the towed vehicle. The radio frequency control signal may be encoded in response to the detection of a particular one of a plurality of safety indicators on the towing vehicle. Upon receiving the encoded radio frequency control signal, a corresponding one of a plurality of safety indicators on the towed vehicle may then be automatically connected to the power source on the towed vehicle. Therefore, the power source and the safety indicator on the towed vehicle are automatically controlled from the towing vehicle without a wire connection between the towing vehicle and the towed vehicle.

1 Claim, 3 Drawing Sheets

WIRELESS SAFETY INDICATOR CONTROL SYSTEM FOR TOWED VEHICLES

BACKGROUND OF THE INVENTION

1. Technical Field

The present invention relates in general to safety indicators for vehicles, and in particular to an improved method and system for controlling safety indicators on a towed vehicle.

2. Description of the Related Art

The use of safety indicators on motor vehicles is well-known in the prior art. Such safety indicators include turn signals, brake lights, back-up lights, hazard lights, audible indicators activated when a vehicle backs up, and other similar safety indicators.

When a motor vehicle is used as a towing vehicle for towing a towed vehicle, it is desirable and highly advisable that a duplicate set of safety indicators be attached to the towed vehicle so that drivers behind the towed vehicle may know the status of both the towed vehicle and the towing vehicle. Typically, when vehicles are towed, safety indicators on the towed vehicle are connected to the towing vehicle via a set of wires that provide power to a safety indicator on the towed vehicle that corresponds to a safety indicator on the towing vehicle. This connection of wires between the towed vehicle and the towing vehicle causes several problems.

First, if the towed vehicle has no useable safety indicators, additional safety indicators are typically mounted to the rear of the towed vehicle. Because the safety indicators are typically mounted on the outside of the towed vehicle, wires must be strung from the safety indicators at the rear of the towed vehicle to a connection on the towing vehicle. Many times there is no place to securely attach these wires on the towed vehicle. If these wires are not secured to the towed vehicle, they may be blown about by wind or sag so that they drag along the road. Wires that are blown by the wind may weaken and wear the insulation, which will eventually cause the wires to short circuit. Additionally, wires that blow against the painted surface of a towed vehicle may damage or scratch the surface of the towed vehicle. The paint of the towed vehicle may also be damaged if the wires are attached with an adhesive fastener, such as tape.

Running wires from the rear of the towed vehicle to the towing vehicle also takes time. In many situations, it is important that the towed vehicle be quickly connected to the towing vehicle so that, for example, an accident scene may be cleared by a tow truck. Precious time may be wasted connecting safety indicators with wires. Another problem with connecting safety indicators with wires occurs in the connectors between the towed vehicle and the towing vehicle. These connectors may oxidize or weather over time, and become loose due to abuse or exposure to vibration, all of which may cause such connectors to become unreliable. Additionally, a connector on a towed vehicle may be physically incompatible with a mating connector on the towing vehicle. Such incompatibility may require the use of adapters or require the use of multiple connector types on the towing vehicle to accommodate various towed vehicles.

It is also known in the prior art that auxiliary lighting systems attached to the exterior of a motor vehicle may be wirelessly controlled from the cabin of the vehicle. The purpose of such wireless control is to avoid cutting a hole through the firewall to install wires from the interior of the vehicle through the firewall to the engine compartment where relays that control the power to the auxiliary lighting systems are located. Such a system for wirelessly controlling auxiliary lights is shown in U.S. Pat. No. 5,195,813 to Brown. The invention in Brown, however, is not useful for solving the problem caused by connecting wires between a towing vehicle and safety indicators on a towed vehicle because Brown teaches connecting a wire from a battery in the vehicle that has the transmitter to auxiliary lights on the same vehicle. Furthermore, Brown requires a driver to operate switches from the cabin of the vehicle which would be inconvenient and perhaps unsafe for operating safety indicators on a towed vehicle.

Another problem with wiring safety indicators on a towed vehicle into the electrical system of the towing vehicle occurs with the flasher in the towing vehicle. Many times the flasher in the towing vehicle is not able to accommodate the increase in the electrical load caused by connecting and supplying power to the safety indicators on the towed vehicle. This increase in electrical load may cause the flasher in the towing vehicle to flash rapidly and therefore fail to provide a proper indication.

In summary, known means of connecting and controlling safety indicators on a towed vehicle have the disadvantages of requiring too much time to connect, relying on connections that are abused and subject to harsh environments, damaging the finish on a towed vehicle with blowing wires, overloading flasher circuits in the towing vehicle, and having incompatible electrical connectors between towing and towed vehicles. Because of these disadvantages, a great need exists for a safety indicator control system for towed vehicles that is quickly and easily installed on the towed vehicle, provides a reliable means for activating the safety indicators, eliminates wear and tear on the exterior finish of towed vehicles, and is not distracting to the operator of the towing vehicle as the towing vehicle is driven.

SUMMARY OF THE INVENTION

The foregoing disadvantages in the prior art are overcome in the present invention by first detecting activation of a safety indicator on a towing vehicle using sensing means locating on the towing vehicle. In response to detecting activation of the safety indicator on the towing vehicle, a radio frequency control signal is transmitted from a transmitter means on the towing vehicle. Thereafter, the radio frequency control signal is received on a towed vehicle using receiver means powered by a power source located on the towed vehicle. In response to receiving the radio frequency control signal, a safety indicator on the towed vehicle is automatically connected to the power source on the towed vehicle to activate the safety indicator on the towed vehicle. The radio frequency control signal may be encoded in response to the detection of a particular one of a plurality of safety indicators on the towing vehicle. Upon receiving the encoded radio frequency control signal, a corresponding one of a plurality of safety indicators on the towed vehicle may then be automatically connected to the power source on the towed vehicle. Therefore, the power source and the safety indicator on the towed vehicle are automatically controlled from the towing vehicle without a wire connection between the towing vehicle and the towed vehicle.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
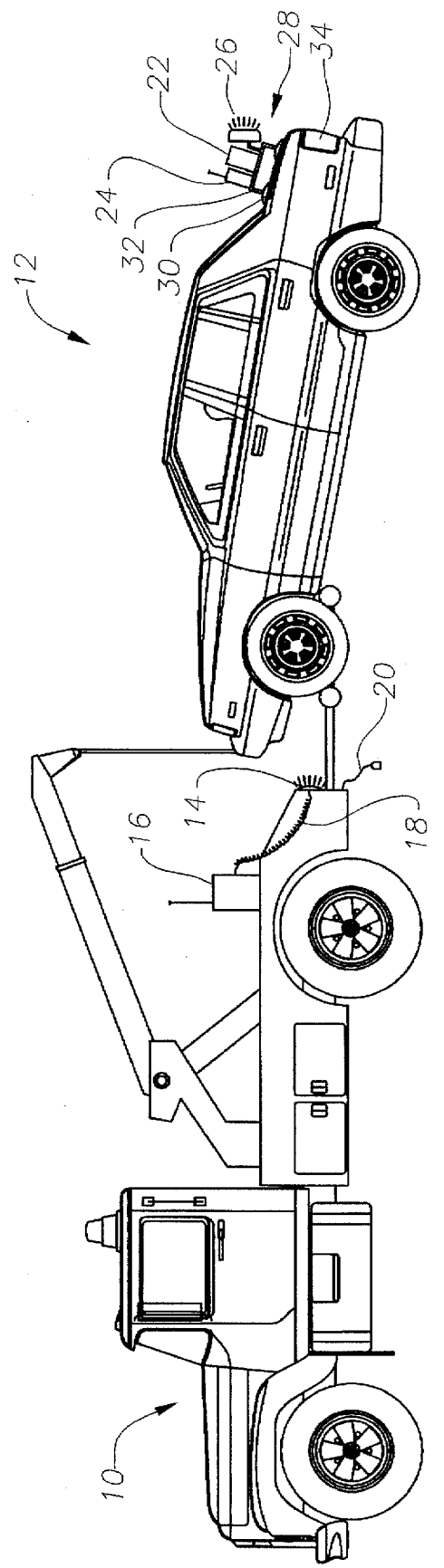
FIG. 1 illustrates a towing vehicle and a towed vehicle having a safety indicator control system in accordance with the method and system of the present invention.

With reference now to the figures, and in particular to FIG. 1, there is depicted towing vehicle 10 and towed vehicle 12. Towed vehicle 12 is securely coupled to towing vehicle 10 for the purpose of towing towed vehicle 12. Towing vehicle 10 includes one or more safety indicators 14. As illustrated in FIG. 1, safety indicator 14 is a tail light, turn signal, or hazard light.

Transmitter unit 16 is coupled to the safety indicator system on towing vehicle 10 via wire 18 for sensing activation of safety indicator 14. Alternatively, transmitter unit 16 may sense activation of safety indicator 14 by connecting wire 18 to a conventional trailer lighting wiring harness, such as wiring harness 20. If towing vehicle 10 has a trunk, transmitter unit 16 may be located in the trunk of towing vehicle 10 so that it is secure and out of sight.

Mounted to towed vehicle 12 are: power source 22, receiver unit 24, and safety indicator 26. In one embodiment of the present invention, power source 22, receiver unit 24, and safety indicator 26 may be mounted to towed vehicle 12 using mounting system 28.

Receiver unit 24 receives a radio frequency control signal from transmitter unit 16. Power source 22 provides power to receiver unit 24 and safety indicator 26. Power source 22 may be implemented with a battery.

Safety indicator 26 may be implemented with a light, an audible signaling device, or another means of providing information regarding the status of towing vehicle 10 and towed vehicle 12 to other drivers behind towed vehicle 12. For example, a plurality of safety indicators 26 may be used for a left turn signal, a right turn signal, brake lights, or tail lights. Each of these safety indicators may be used to represent a different status, such as the driver slowing down (as indicated by a brake light) to make a right turn (as indicated by a right turn signal). Safety indicator 26 may also include back-up lights or an audible alarm that indicates towing vehicle 10 has been placed in a reverse gear.

In an alternate embodiment of the present invention, power source 22, receiver unit 24, and safety indicator 26 may all be packaged in a small enclosure so that a plurality of such small enclosures may be distributed on towed vehicle 12 such that, for example, a left turn signal is placed on the left side of towed vehicle 12 and a right turn signal is placed on the right side of towed vehicle 12.

Mounting system 28 is designed to hold power source 22, receiver unit 24, and safety indicator 26 securely to the rear portion of towed vehicle 12 without damaging the finish on towed vehicle 12. As shown in FIG. 1, mounting system 28 may include suction cups 30 and mounting bar 32 for securing power source 22, receiver unit 24, and safety indicator 26. Additionally, a plurality of safety indicators 26 may be distributed along mounting bar 32 for providing tail lights and turn signals.

Figure 2:
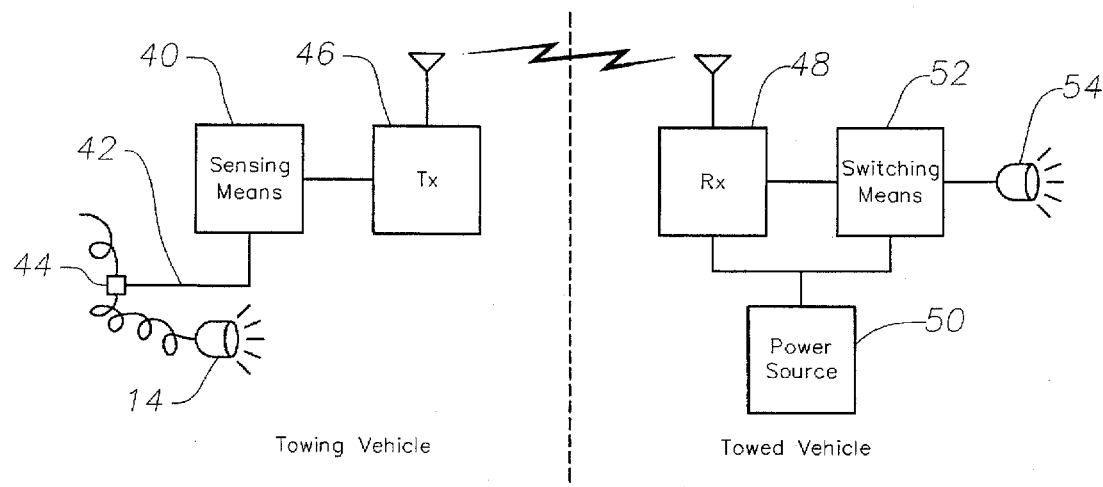
FIG. 2 is a high-level schematic diagram which illustrates the major components of the safety indicator control system of the present invention.

With reference now to FIG. 2, there is depicted a high-level schematic diagram which further illustrates the major components of the method and system of the present invention. As illustrated, safety indicator 14 on towing vehicle 10 is activated. Sensing means 40 is coupled to a part of the safety indicator system on towing vehicle 10 for determining that safety indicator 14 has been activated. As illustrated in FIG. 2, sensing means 40 receives input from wire 42 that is coupled to a power source for safety indicator 14 by connector 44. In an alternate embodiment, reference numeral 44 may include a sensor that does not physically connect to the power source for safety indicator 14. Such a sensor may be implemented with a Hall-effect probe, or other electronic field sensor. Thus, sensing means 40 may utilize any reliable means to determine that safety indicator 14 has been activated.

Once sensing means 40 has detected the activation of safety indicator 14, a signal is sent to transmitter 46, in response thereto transmitter 46 transmits a radio frequency control signal. If sensing means 40 senses a plurality of safety indicators, the radio frequency control signal may be encoded to represent the activation of selected ones within the group of safety indicators on towing vehicle 10. In one embodiment of the present invention, the transmitted radio frequency control signal is a digital control signal that facilitates encoding and offers greater rejection of spurious noise signals at the receiver.

The transmission of the radio frequency control signal from towing vehicle 10 is received on towed vehicle 12 by receiver 48. Receiver 48 on towed vehicle 12 is powered by power source 50, which may be implemented by a battery.

Both receiver 48 and power source 50 are connected to switching means 52. Switching means 52 receives a signal from receiver 48 that directs switching means 52 to connect safety indicator 54 to power source 50 to activate safety indicator 54. If more than one safety indicator 54 is used on towed vehicle 12, receiver 48 decodes an encoded radio frequency control signal and directs switching means 52 to connect power to a selected one of the group of safety indicators 54 on towed vehicle 12. Switching means 52 may be implemented with solid state transistors that are capable of supplying enough power to safety indicator 54, or alternatively may be implemented with relays.

In order to reduce the amount of power consumed from power source 50, safety indicator 54 may utilize low power, light-emitting diodes (LEDs) that are bright enough to be viewed by other drivers in typical driving conditions. Such LEDs typically require less power to produce the same amount of light that an incandescent bulb would produce.

Figure 3:
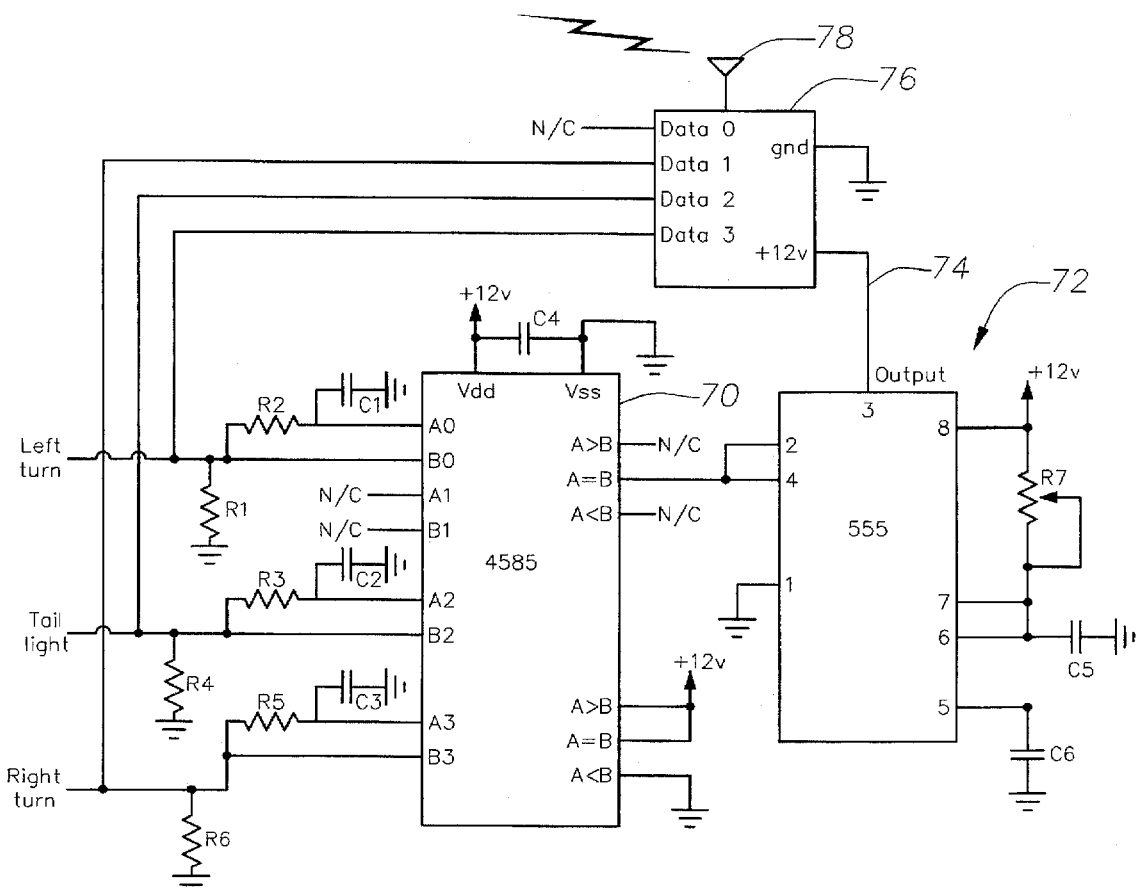
FIG. 3 is a schematic diagram of the portion of the safety indicator control system that is located in the towing vehicle in accordance with the method and system of the present invention.

With reference now to FIG. 3, there is depicted a schematic diagram of transmitter unit 16 on towing vehicle 10 (see FIG. 1) in accordance with the method and system of the present invention. As illustrated, signals from a left turn light, a tail light or running light, and a right turn light are input into comparator 70 for detecting the activation or deactivation of these safety indicators on towing vehicle 10. These inputs are typically received from the power source to such safety indicators on towing vehicle 10. Comparator 70 is configured to detect a change in the status of the safety indicators—that is, detecting one or more indicators turning on or off.

Once comparator 70 has detected the activation or deactivation of a safety indicator, an output signal from comparator 70 triggers timer circuit 72. Timer circuit 72 may be implemented with the timer commonly sold under the part number 555. Once timer circuit 72 has been triggered, timer circuit 72 produces an output pulse 74 that is coupled to the power input of transmitter 76. This causes transmitter 76 to briefly transmit the status of safety indicators on towing vehicle 10 during the duration of output pulse 74.

Transmitter 76 may be implemented utilizing transmitter part number TX-99 V3.0, manufactured by Ming Engineering and Products Company of City of Industry, Calif. 91748. Transmitter 76 also receives input from the power source to the left turn, tail light, and right turn safety indicators on towing vehicle 10. These inputs from the safety indicators are connected to data inputs on transmitter 76 so that transmitter 76 may encode a digital signal representing the condition of all of such data inputs. Transmitter 76 is also coupled to antenna 78 for transmitting the radio frequency control signal.

In another embodiment of transmitter unit 16, the power for comparator 70, timer circuit 72, and transmitter 76 may be supplied by one or more of the power sources for safety indicators on towing vehicle 10. For example, the power for the circuits mentioned above may be taken from the power source for the left turn light, the tail light, and the right turn light by connecting the anode of 3 diodes to each of these power sources, and powering the circuits in the transmitter unit from a node that connects to each of the cathodes of the diodes mentioned above. This common node connecting all the cathodes may also include a capacitor for storing enough energy to transmit a radio frequency control signal to turn safety indicators off on the towed vehicle once all power is removed from all safety indicators on the towing vehicle.

By powering the circuits in transmitter unit 76 from the power source for safety indicators 26, less power is used because power is not continuously drawn and the wiring connections to transmitter unit 16 are simpler because a constant 12-volt power source is not required at the location that transmitter unit 16 is mounted within towing vehicle 10. In other words, transmitter unit 16 may be connected to a conventional wiring harness 20, which typically does not include a constant 12-volt power source. Additionally, the connection of the circuits in transmitter unit 16 to a power source for a safety indicator on towing vehicle 10 is possible because circuits within transmitter unit 16 are low power circuits that draw a negligible amount of current from safety indicators 26 and do not affect the operation of safety indicators 26.

Figure 4:
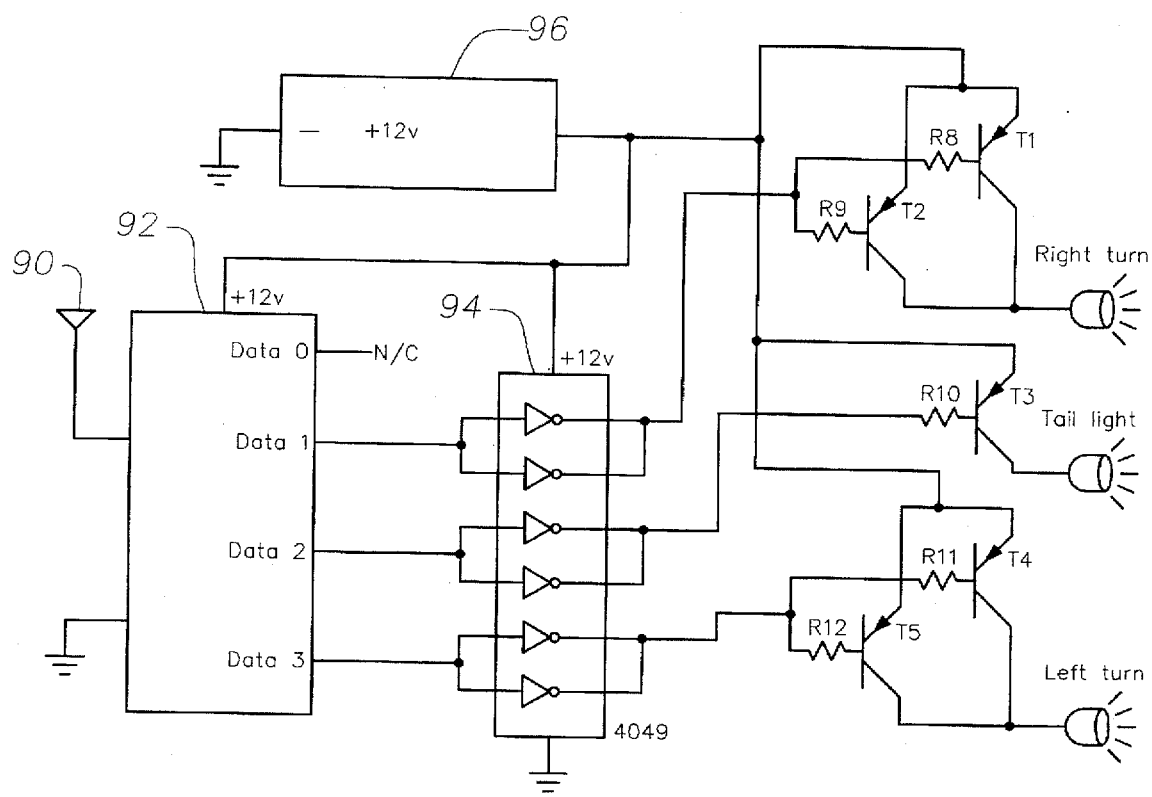
FIG. 4 is a schematic diagram of the portion of the safety indicator control system that is located in the towed vehicle in accordance with the method and system of the present invention.

With reference now to FIG. 4, there is depicted a schematic diagram of the receiver unit on towed vehicle 12 in accordance with the method and system of the present invention. As illustrated, the radio frequency control signal is received through antenna 90 by receiver 92. In the embodiment illustrated in FIG. 4, the radio frequency control signal is encoded so that the control signal represents the status of four data outputs on receiver 92. Thus, receiver 92 decodes the encoded radio frequency control signal and such decoded outputs are then latched and passed to buffer 94 so that the decoded signals may be amplified.

The amplified signals from buffer 94 are used to drive transistors that switch power from power source 96 to safety indicators 54. Power source 96 may be implemented utilizing a battery. Such battery is selected to provide sufficient current for driving receiver 92, buffer 94, and safety indicators 54 on towed vehicle 12. In a preferred embodiment, power source 96 is implemented with a 12-volt rechargeable gel cell.

Buffer 94 may be implemented with a hex buffer, which is typically sold under the part number 4049. Receiver 92 may be implemented with the receiver sold under the part number RE-99 V3.0 by Ming Engineering and Products Company of City of Industry, Calif. 91748.

In an alternative embodiment, power source 96 may be implemented with a battery in towed vehicle 12 that is normally used to operated the electrical system in towed vehicle 12. Similarly, safety indicator 54 may be implemented with the factory installed manufacturer's original equipment safety indicators in towed vehicle 12, such as manufacturer's original equipment safety indicator 34 in FIG. 1. In this alternative embodiment, receiver 48 and switching means 52 may be permanently installed in towed vehicle 12 to provide a convenient way of towing towed vehicle 12 behind, say, a motor home, in which sensing means 40 and transmitter 46 have been installed. If the transmitter unit and receiver unit of the present invention are connected as described above, no electrical connections are necessary between a motor home or recreational vehicle and a car towed by the motor home.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

What is claimed is:

1. A safety indicator control system kit for controlling, from a towing vehicle, a safety indicator on a towed vehicle, said kit comprising:

sensing means, for installing on said towing vehicle, for sensing activation of a safety indicator on said towing vehicle and producing an indicator active signal in response to detection of said activation;

transmitter means, for installing on said towing vehicle and coupling to a transmitter power source on said towing vehicle and said indicator active signal, for transmitting a radio frequency control signal in response to said indicator active signal;

receiver means, for installing in said towed vehicle and for coupling to a receiver power source on said towed vehicle, for receiving said radio frequency control signal;

switching means, for coupling to said receiver power source, said receiver means, and said safety indicator on said towed vehicle, for automatically connecting power to said safety indicator on said towed vehicle in response to said receiver receiving said radio frequency control signal; and wherein said switching means includes means for coupling to a manufacturer's original equipment safety indicator on said towed vehicle, for automatically connecting power to said manufacturer's original equipment safety indicator on said towed vehicle in response to said receiver receiving said radio frequency control signal.

* * * * *